UNITED STATES PATENT OFFICE.

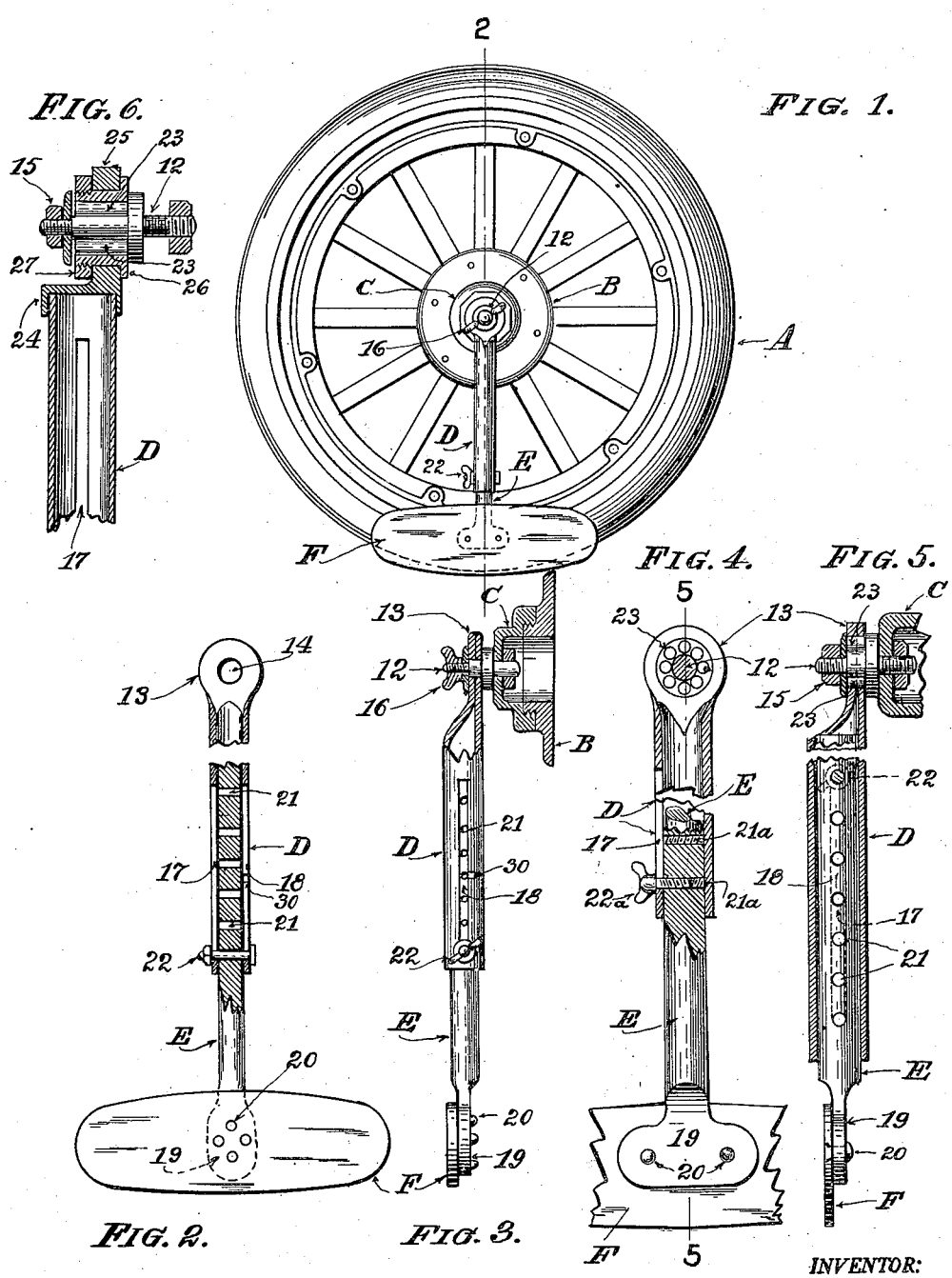

SHIRLEY Q. STANLEY, OF CHICAGO, ILLINOIS.

MUD-GUARD FOR MOTOR-VEHICLE WHEELS.

1,254,944.            Specification of Letters Patent.     Patented Jan. 29, 1918.

Application filed February 15, 1917. Serial No. 148,733.

*To all whom it may concern:*

Be it known that I, SHIRLEY Q. STANLEY, a citizen of the United States, and a resident of the city of Chicago, in the county of Cook and State of Illinois, have invented a certain new and useful Improvement in Mud-Guards for Motor-Vehicle Wheels; and I do hereby declare that the following description of my said invention, taken in connection with the accompanying sheet of drawing, forms a full, clear, and exact specification, which will enable others skilled in the art to which it appertains to make and use the same.

My invention relates generally to improvements in mud guards for motor vehicle wheels, and it consists, essentially, in the novel and peculiar combination of parts and details of construction, as hereinafter first fully set forth and described and then pointed out in the claim.

The object of my present invention is the production of an efficient, serviceable, and attractive attachment to a motor vehicle, which is especially designed to prevent spattering of dirty water, mud, and other street dirt upon other passing vehicles, persons, &c., when such vehicles are moving on wet and muddy streets and roads. And incidental thereto the object of my invention is the production of a device of the nature indicated, that is capable of being used in connection with motor vehicle wheels, and wheels of different diameters, without change or modification.

Standard motor vehicle wheels vary in size from 28 inches in diameter upward, but few of these wheels being over 38 inches in diameter. My invention is, therefore, constructed to accommodate wheels of these, as well as intermediate sizes, and it can be so made as to fit any particular or special size of wheels.

In the drawings, which form a part of this specification and illustrate the preferred embodiment of my invention as well as several modifications thereof, Figure 1 is an elevation of a motor vehicle wheel supplied with my device for preventing the spattering of unclean water, mud and dirt by the wheels of a motor vehicle. Fig. 2 is a sectional elevation of the device detached from the wheel. Fig. 3 is a side elevation of the same, the upper portion thereof being in section. Fig. 4 is a sectional elevation of the device of a slightly modified construction. Fig. 5 is a longitudinal section on line 5—5 of Fig. 4, the view showing the parts in telescoped condition. Fig. 6 is a sectional view of the upper part of the device illustrating further modification of this device.

A, in the drawings represents a motor vehicle wheel of standard construction. This wheel has the usual central hub B, and on this hub there is placed the oil cap C.

12 is a pivot bolt which projects centrally from the face of the oil cap, from which bolt the mud guard is suspended. This mud guard includes a tube D, of suitable diameter and length, which tube is flattened at its upper end, as shown in the figures at 13, and this flattened portion is centrally punctured, as at 14, to engage the pivot bolt 12 and to oscillate thereon, said tube D being removably held to the pivot bolt 12 in any suitable manner, as for instance, a plain nut 15, or a thumb nut 16.

In the tube D there is a longitudinal slot 17, and, if preferred, another, oppositely located, slot 18, the object of which will farther on appear. Into this tube D telescopes a rod E, which rod may be likewise a tube; and the lower end of this rod is flattened as at 19, to receive a sheet metal plate, shield, or guard F, which shield may be of any desired shape, and it is secured to the flattened portion 19 in any approved manner, preferably by rivets 20. Transversely through this rod E there are a series of, preferably equally-spaced, holes 21, which holes are to receive a bolt or screw 22, wherewith to vertically movably connect the rod E with, and confine it within, the tube D.

Normally, and fitted for the smallest size of motor vehicle wheels, this bolt occupies the lowermost hole 21 in the rod E, and it rests at the lower end of the slot hole 17, and in this condition, the lower margin of the shield F is in close adjacency of the ground over which the wheel is moving. But when fitted for a larger sized wheel, this bolt 22 is moved farther up into the corresponding hole 21 in said rod E; and it is to be noted that the number of holes 21, and their spacing apart is so planned as to correspond to the various sizes of standard motor vehicle wheels, so that it will be readily seen that this device is capable of being used in connection with all the various sizes of motor vehicle wheels without any change whatever, except to locate the bolt 22 in its proper bolt hole 21.

While the construction hereinbefore described is ample and satisfactory for performing the functions indicated, I may desire to modify or amplify this construction by introducing to the flattened upper portion of the tube D, anti-friction rollers 23, to reduce friction and wear to a minimum, such a construction being clearly shown in Figs. 4 and 5; and to further improve this construction and the durability of the device, I may form the upper part of the tube D as shown in Fig. 6. In this figure, 24 indicates a cap secured to the upper end of said tube, there being on said cap a flattened part 25, bored to receive a preferably hardened, steel bushing 26, the end of which is externally screw-threaded to receive a correspondingly constructed collar 27, to retain the bushing 26 in proper position, the bore of the bushing being large enough to accommodate the anti-friction rollers 23, heretofore mentioned.

I have heretofore stated that the tube D has two, oppositely disposed longitudinal slots 17, 18; but this construction may be modified by dispensing with one of these slots, and by tapping the holes in the rod E as shown at 21$^a$ in Fig. 4, and by using a screw 22$^a$, in place of the bolt 22 shown in the remaining figures, all of which modifications described, and others which may suggest themselves to a person skilled in the art to which my invention appertains, may be employed without departing from the scope of my invention as defined in the subjoined claim.

An automobile or motor truck when running on a wet or muddy street projects a stream of dirty water or mud sidewise and slightly to the rear of the wheels, sometimes as far as 25 feet and more, thereby disfiguring other vehicles by this splashing and frequently ruining expensive clothing of persons passing by. This nuisance is completely abated by the introduction of my device, which being suspended at the side or flank of the vehicle wheel, while not preventing this splashing, intercepts the stream of dirty water, etc., and thereby renders the same inoffensive and harmless.

This device is well suited for being made quite attractive, the shapes adopted lending themselves readily for being polished, nickel plated, japanned, and otherwise made ornamental, so that it will rather add to, than detract from, the appearance of an automobile, etc.

It will be noted that this device, being, as it is, pivotally connected to the vehicle, will oscillate on its pivot so that, should an obstruction be met in the road which it cannot overcome, it will swing longitudinally forward or backward, as the case may be, until such obstruction has been passed, when the device will resume its normal position by gravity.

In a device of the nature described, it is desirable that the rod E with its shield F be capable of being held in raised position to enable a tire being removed from the wheel and replaced.

Various means may be employed for this purpose, as for instance a transverse slot 30, Figs. 2 and 3, radiating from the longitudinal slot 17 or the slots 17, 18, so that by slightly rotating said rod E, the bolt 22 will engage said transverse slot or slots and thus keep the said rod in elevated position.

Having thus fully described this invention, I claim as new, and desire to secure to myself by Letters Patent of the United States—

In a device of the nature described, the combination, with a motor vehicle wheel having a central hub, of a pivot bolt connected with said hub, and projecting therefrom, a tubular member, said tubular member having at its upper end a cap, there being on said cap a flattened portion, said flattened portion having an opening therethrough, a bushing in said opening, anti-friction rollers in said bushing and bearing on said pivot bolt, said flattened portion being at one side of the axial line of said tubular member, a rod in said tubular member, said tubular member being longitudinally slotted, said rod having a series of spaced apart, transverse holes, a bolt in one of said holes and vertically movable in said slot, and a shield at the lower end of said rod, the lower edge of said shield being close to the ground over which said wheel is moving.

In testimony that I claim the foregoing as my invention, I have hereunto set my hand.

SHIRLEY Q. STANLEY.

Copies of this patent may be obtained for five cents each, by addressing the "Commissioner of Patents, Washington, D. C."